US010129467B2

(12) United States Patent
Fu et al.

(10) Patent No.: US 10,129,467 B2
(45) Date of Patent: Nov. 13, 2018

(54) VIDEO PHOTOGRAPHING PROCESSING METHOD AND APPARATUS

(71) Applicant: Huawei Technologies Co., Ltd., Shenzhen (CN)

(72) Inventors: Jiali Fu, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/198,931

(22) Filed: Jun. 30, 2016

(65) Prior Publication Data

US 2016/0316143 A1    Oct. 27, 2016

Related U.S. Application Data

(63) Continuation of application No. PCT/CN2014/092588, filed on Nov. 28, 2014.

(30) Foreign Application Priority Data

Dec. 31, 2013 (CN) ............ 2013 1 0751044
Aug. 22, 2014 (CN) ............ 2014 1 0419648

(51) Int. Cl.
*H04N 5/232* (2006.01)
*H04N 1/21* (2006.01)
*H04N 1/00* (2006.01)

(52) U.S. Cl.
CPC ........... *H04N 5/23235* (2013.01); *H04N 1/00* (2013.01); *H04N 1/215* (2013.01); *H04N 5/232* (2013.01)

(58) Field of Classification Search
None
See application file for complete search history.

(56) References Cited

U.S. PATENT DOCUMENTS 8,847,884 B2    9/2014 Li et al.
2005/0036044 A1*  2/2005 Funakura ........... G06K 9/00228
                                                    348/239
(Continued)

FOREIGN PATENT DOCUMENTS

CN    101246644 A    8/2008
CN    101472063 A    7/2009
(Continued)

OTHER PUBLICATIONS

Partial English Translation and Abstract of Chinese Patent Application No. CN101246644, Aug. 20, 2008, 15 pages.
Partial English Translation and Abstract of Chinese Patent Application No. CN101593422, Part 1, Dec. 2, 2009, 3 pages.
Partial English Translation and Abstract of Chinese Patent Application No. CN101593422, Part 2, Dec. 2, 2009, 2 pages.
Partial English Translation and Abstract of Chinese Patent Application No. CN103106798, Part 1, May 15, 2013, 4 pages.
Partial English Translation and Abstract of Chinese Patent Application No. CN103106798, Part 2, May 15, 2013, 3 pages.
(Continued)

*Primary Examiner* — Mark T Monk
(74) *Attorney, Agent, or Firm* — Conley Rose, P.C.

(57) ABSTRACT

Embodiments of the present disclosure disclose a video photographing processing method and apparatus, and relate to the field of information technologies. The embodiments of the present disclosure are applicable to automatic generation of a photo during video photographing. Various embodiments provide a video photographing processing method, including acquiring at least one piece of behavior information of a photographed person when a camera is turned on; determining whether behavior information for which a photo needs to be generated exists in the at least one piece of behavior information; and if the behavior information for which a photo needs to be generated exists in the at least one piece of behavior information, configuring a target video frame as a photo that needs to be generated.

12 Claims, 8 Drawing Sheets

(56) References Cited

U.S. PATENT DOCUMENTS

| | | | |
|---|---|---|---|
| 2007/0046785 A1 | 3/2007 | Matsumoto et al. | |
| 2009/0046900 A1* | 2/2009 | Ogawa | G06K 9/00228 382/118 |
| 2009/0109297 A1* | 4/2009 | Nakagawa | G11B 27/10 348/222.1 |
| 2011/0063456 A1* | 3/2011 | Ohnishi | G06T 7/0002 348/207.2 |
| 2013/0104080 A1 | 4/2013 | Bosworth et al. | |
| 2016/0316143 A1 | 10/2016 | Fu et al. | |

FOREIGN PATENT DOCUMENTS

| | | |
|---|---|---|
| CN | 101593422 A | 12/2009 |
| CN | 102541259 A | 7/2012 |
| CN | 102946516 A | 2/2013 |
| CN | 103106798 A | 5/2013 |
| CN | 103347117 A | 10/2013 |
| CN | 103747177 A | 4/2014 |

OTHER PUBLICATIONS

Partial English Translation and Abstract of Chinese Patent Application No. CN103347117, Oct. 9, 2013, 10 pages.

Foreign Communication From a Counterpart Application, Chinese Application No. 201410419648.2, Chinese Office Action dated Dec. 2, 2016, 8 pages.

Foreign Communication From a Counterpart Application, PCT Application No. PCT/CN2014/092588, English Translation of International Search Report dated Feb. 26, 2015, 3 pages.

Foreign Communication From a Counterpart Application, PCT Application No. PCT/CN2014/092588, English Translation of Written Opinion dated Feb. 26, 2015, 9 pages.

\* cited by examiner

VIDEO PHOTOGRAPHING PROCESSING METHOD AND APPARATUS

CROSS-REFERENCE TO RELATED APPLICATIONS

This application is a continuation of International Application No. PCT/CN2014/092588, filed on Nov. 28, 2014, which claims priority to Chinese Patent Application No. 201310751044.3, filed on Dec. 31, 2013 and Chinese Patent Application No. 201410419648.2, filed on Aug. 22, 2014, all of which are incorporated herein by reference in their entities.

TECHNICAL FIELD

The present disclosure relates to the field of information technologies, and in particular, to a video photographing processing method and apparatus.

BACKGROUND

When a photographed object is in a moving state, it is difficult to accurately capture the photographed object in a traditional photographing manner. For example, when an animal or a baby is being photographed, it is difficult to control the animal or the baby to be in a static state, and therefore, it is difficult to accurately capture the animal or the baby in the traditional photographing manner.

Currently, a photo is automatically generated during video photographing, so that the photographed object is accurately captured. Social network information included in a video is acquired first, then rating and sorting are performed on a video frame according to the social network information included in the video, and finally, one frame or more frames are selected, as a photo required by a user, from various video frames according to scores respectively corresponding to the various video frames.

However, when the photo required by the user is selected using scores separately corresponding to the various video frames determined using the social network information, a video frame is selected according to only the social network information included in the video, thereby leading to relatively low accuracy of video frame selection.

SUMMARY

Embodiments of the present disclosure provide a video photographing processing method and apparatus, which can improve accuracy of video frame selection.

Technical solutions adopted in the embodiments of the present disclosure are as follows.

According to a first aspect, an embodiment of the present disclosure provides a video photographing processing method, including acquiring at least one piece of behavior information of a photographed person when a camera is turned on; determining whether behavior information for which a photo needs to be generated exists in the at least one piece of behavior information; and if the behavior information for which a photo needs to be generated exists in the at least one piece of behavior information, configuring a target video frame as a photo that needs to be generated, where the target video frame is a video frame corresponding to the behavior information for which a photo needs to be generated, or any video frame subsequent to a video frame corresponding to the behavior information for which a photo needs to be generated.

With reference to the first aspect, in a first possible implementation manner of the first aspect, the behavior information includes expression behavior information, voice behavior information, and action behavior information.

With reference to the first aspect or the first possible implementation manner of the first aspect, in a second possible implementation manner of the first aspect, before the step of configuring a target video frame as a photo that needs to be generated, the method further includes performing resolution processing on the target video frame, to improve resolution of the target video frame; and the step of configuring a target video frame as a photo that needs to be generated includes configuring the target video frame on which resolution processing is performed as the photo that needs to be generated.

With reference to the first aspect, the first possible implementation manner of the first aspect, or the second possible implementation manner of the first aspect, in a third possible implementation manner of the first aspect, when there are multiple target video frames, before the step of configuring a target video frame as a photo that needs to be generated, the method further includes selecting at least one target video frame from the multiple target video frames according to a photo selection policy; and the step of configuring a target video frame as a photo that needs to be generated includes configuring the selected at least one target video frame as the photo that needs to be generated.

With reference to the first aspect, the first possible implementation manner of the first aspect, the second possible implementation manner of the first aspect, or the third possible implementation manner of the first aspect, in a fourth possible implementation manner of the first aspect, the any video frame subsequent to the video frame corresponding to the behavior information for which a photo needs to be generated is a next adjacent video frame subsequent to the video frame corresponding to the behavior information for which a photo needs to be generated, or a video frame that is at a next time point subsequent to the video frame corresponding to the behavior information for which a photo needs to be generated.

According to a second aspect, an embodiment of the present disclosure provides a video photographing processing apparatus, including an acquiring unit configured to acquire at least one piece of behavior information of a photographed person when a camera is turned on; a determining unit configured to determine whether behavior information for which a photo needs to be generated exists in the at least one piece of behavior information acquired by the acquiring unit; and a configuration unit configured to, if the determining unit determines that the behavior information for which a photo needs to be generated exists in the at least one piece of behavior information, configure a target video frame as a photo that needs to be generated, where the target video frame is a video frame corresponding to the behavior information for which a photo needs to be generated, or any video frame subsequent to a video frame corresponding to the behavior information for which a photo needs to be generated.

With reference to the second aspect, in a first possible implementation manner of the second aspect, the behavior information acquired by the acquiring unit includes expression behavior information, voice behavior information, and action behavior information.

With reference to the second aspect or the first possible implementation manner of the second aspect, in a second possible implementation manner of the second aspect, the apparatus further includes a processing unit; where the processing unit is configured to perform resolution processing on the target video frame, to improve resolution of the target video frame; and the configuration unit is configured to configure the target video frame on which the processing unit performs resolution processing as the photo that needs to be generated.

With reference to the second aspect, the first possible implementation manner of the second aspect, or the second possible implementation manner of the second aspect, in a third possible implementation manner of the second aspect, the apparatus further includes a selection unit; where the selection unit is configured to, when there are multiple target video frames, select at least one target video frame from the multiple target video frames according to a photo selection policy; and the configuration unit is configured to configure, as the photo that needs to be generated, the at least one target video frame selected by the selection unit.

With reference to the second aspect, the first possible implementation manner of the second aspect, the second possible implementation manner of the second aspect, or the third possible implementation manner of the second aspect, in a fourth possible implementation manner of the second aspect, the any video frame subsequent to the video frame corresponding to the behavior information for which a photo needs to be generated is a next adjacent video frame subsequent to the video frame corresponding to the behavior information for which a photo needs to be generated, or a video frame that is at a next time point subsequent to the video frame corresponding to the behavior information for which a photo needs to be generated.

According to a third aspect, an embodiment of the present disclosure provides a video photographing processing method, including, when a camera is turned on, receiving a behavior instruction of a person that performs photographing, where the behavior instruction is used to instruct to generate a photo; and configuring a target video frame as a photo that needs to be generated, where the target video frame is a video frame corresponding to the behavior instruction, or any video frame subsequent to a video frame corresponding to the behavior instruction.

With reference to the third aspect, in a first possible implementation manner of the third aspect, the behavior instruction includes an expression behavior instruction, a voice behavior instruction, and an action behavior instruction.

With reference to the third aspect, or the first possible implementation manner of the third aspect, in a second possible implementation manner of the third aspect, before the step of configuring a target video frame as a photo that needs to be generated, the method further includes performing resolution processing on the target video frame, to improve resolution of the target video frame; and the step of configuring a target video frame as a photo that needs to be generated includes configuring the target video frame on which resolution processing is performed as the photo that needs to be generated.

With reference to the third aspect, the first possible implementation manner of the third aspect, or the second possible implementation manner of the third aspect, in a third possible implementation manner of the third aspect, when there are multiple target video frames, before the step of configuring a target video frame as a photo that needs to be generated, the method further includes selecting at least one target video frame from the multiple target video frames according to a photo selection policy; and the step of configuring the target video frame as a photo that needs to be generated includes configuring the selected at least one target video frame as the photo that needs to be generated.

With reference to the third aspect, the first possible implementation manner of the third aspect, the second possible implementation manner of the third aspect, or the third possible implementation manner of the third aspect, in a fourth possible implementation manner of the third aspect, the any video frame subsequent to the video frame corresponding to the behavior instruction is a next adjacent video frame subsequent to the video frame corresponding to the behavior instruction, or a video frame that is at a next time point subsequent to the video frame corresponding to the behavior instruction.

According to a fourth aspect, an embodiment of the present disclosure provides a video photographing processing apparatus, including a receiving unit configured to, when a camera is turned on, receive a behavior instruction of a person that performs photographing, where the behavior instruction is used to instruct to generate a photo; and a configuration unit configured to configure a target video frame as a photo that needs to be generated, where the target video frame is a video frame corresponding to the behavior instruction received by the receiving unit, or any video frame subsequent to a video frame corresponding to the behavior instruction.

With reference to the fourth aspect, in a first possible implementation manner of the fourth aspect, the behavior instruction received by the receiving unit includes an expression behavior instruction, a voice behavior instruction, and an action behavior instruction.

With reference to the fourth aspect or the first possible implementation manner of the fourth aspect, in a second possible implementation manner of the fourth aspect, the apparatus further includes a processing unit; where the processing unit is configured to perform resolution processing on the target video frame, to improve resolution of the target video frame; and the configuration unit is configured to configure the target video frame on which the processing unit performs resolution processing as the photo that needs to be generated.

With reference to the fourth aspect, the first possible implementation manner of the fourth aspect, or the second possible implementation manner of the fourth aspect, in a third possible implementation manner of fourth second aspect, the apparatus further includes a selection unit; where the selection unit is configured to, when there are multiple target video frames, select at least one target video frame from the multiple target video frames according to a photo selection policy; and the configuration unit is configured to configure, as the photo that needs to be generated, the at least one target video frame selected by the selection unit.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the any video frame subsequent to the video frame corresponding to the behavior instruction is a next adjacent video frame subsequent to the video frame corresponding to the behavior instruction, or a video frame that is at a next time point subsequent to the video frame corresponding to the behavior instruction.

According to a fifth aspect, an embodiment of the present disclosure provides a video photographing processing method, including acquiring each video frame when a camera is turned on; selecting at least one target video frame from the video frames according to a preset photo selection policy; and configuring the selected at least one target video frame as a photo that needs to be generated.

With reference to the fifth aspect, in a first possible implementation manner of the fifth aspect, before the step of configuring the selected at least one target video frame as a photo that needs to be generated, the method further includes performing resolution processing on the at least one target video frame, to improve resolution of the at least one target video frame; and the step of configuring the selected at least one target video frame as a photo that needs to be generated includes configuring the target video frame on which resolution processing is performed as the photo that needs to be generated.

According to a sixth aspect, an embodiment of the present disclosure provides a video photographing processing apparatus, including an acquiring unit configured to acquire each video frame when a camera is turned on; a selection unit configured to select, according to a preset photo selection policy, at least one target video frame from the video frames acquired by the acquiring unit; and a configuration unit configured to configure, as a photo that needs to be generated, the at least one target video frame selected by the selection unit.

With reference to the sixth aspect, in a first possible implementation manner of the sixth aspect, the apparatus further includes a processing unit; where the processing unit is configured to perform resolution processing on the at least one target video frame selected by the selection unit, to improve resolution of the at least one target video frame; and the configuration unit is configured to configure the target video frame on which the processing unit performs resolution processing as the photo that needs to be generated.

According to the video photographing processing method and apparatus provided in the embodiments of the present disclosure, when a camera is turned on, at least one piece of behavior information of a photographed person is acquired first, then it is determined whether behavior information for which a photo needs to be generated exists in the at least one piece of behavior information, and if the behavior information for which a photo needs to be generated exists in the at least one piece of behavior information, a target video frame is configured as a photo that needs to be generated; or a behavior instruction of a person that performs photographing is received first, and then a target video frame is configured as a photo that needs to be generated. Compared with a current manner in which a photo that needs to be generated is selected using scores separately corresponding to video frames, in this embodiment of the present disclosure, when a camera is turned on, it is determined whether behavior information that is of a photographed person and for which a photo needs to be generated exists, or a behavior instruction of a person that performs photographing is received, so that a video frame can be selected according to a requirement that is for a photo and that is of the photographed person or the person that performs video photographing, so that accuracy of video frame selection can be improved.

According to the video photographing processing method and apparatus provided in the embodiments of the present disclosure, when a camera is turned on, each video frame is acquired first, then at least one target video frame is selected from the video frames according to a preset photo selection policy, and finally, the selected at least one target video frame is configured as a photo that needs to be generated. Compared with a current manner in which a photo that needs to be generated is selected using scores separately corresponding to video frames, in this embodiment of the present disclosure, when a camera is turned on, a photo that needs to be generated is selected according to a preset photo selection policy, so that during video photographing, the photo can be automatically generated, thereby improving accuracy of video frame selection.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Embodiment 1

Figure 1:
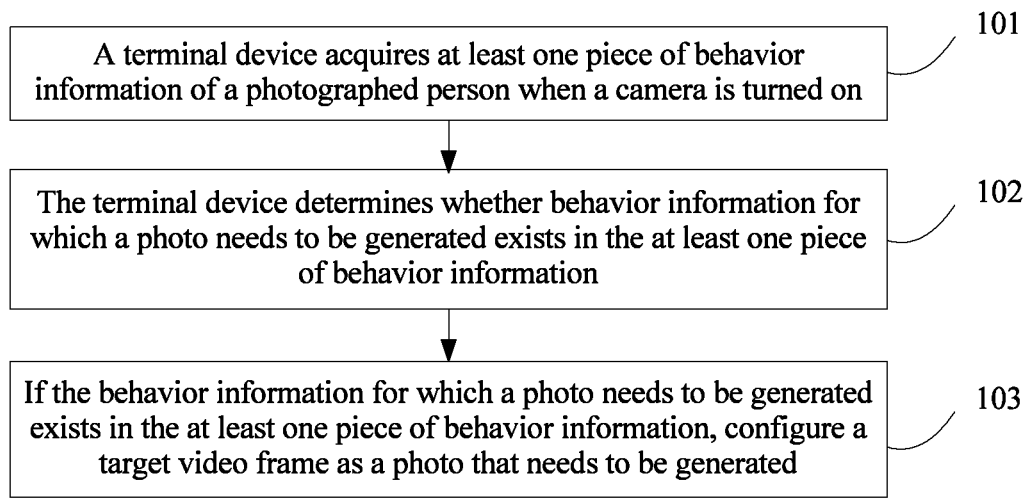
FIG. 1 is a flowchart of a video photographing processing method according to Embodiment 1 of the present disclosure.

This embodiment of the present disclosure provides a video photographing processing method, and as shown in FIG. 1, the method includes the following steps.

Step 101. A terminal device acquires at least one piece of behavior information of a photographed person when a camera is turned on.

The camera described herein is a camera of a device that executes the video photographing processing method. For example, the device may be a mobile phone in one embodiment, may be a camera in another embodiment, or may be another terminal device in another embodiment.

In one embodiment, when the camera is turned on, a video may be photographed, where the photographed video may be of any duration, and includes one or more video frames.

In another embodiment, when the camera is turned on, a photo may also be taken. In another embodiment, when the camera is turned on, framing may be performed for photographing a video or for taking a photo.

The following embodiments also have similar descriptions.

Step 102. The terminal device determines whether behavior information for which a photo needs to be generated exists in the at least one piece of behavior information.

The behavior information for which a photo needs to be generated is used for triggering generation of a photo.

Step 103. If the behavior information for which a photo needs to be generated exists in the at least one piece of behavior information, configure a target video frame as a photo that needs to be generated.

The target video frame is a video frame corresponding to the behavior information for which a photo needs to be generated, or any video frame subsequent to a video frame corresponding to the behavior information for which a photo needs to be generated. In this embodiment of the present disclosure, if the target video frame is the video frame corresponding to the behavior information for which a photo needs to be generated, step 103 may be the terminal device configures the video frame corresponding to the behavior information for which a photo needs to be generated as the photo that needs to be generated; if the target video frame is any video frame subsequent to the video frame corresponding to the behavior information for which a photo needs to be generated, step 103 may be the terminal device configures any video frame subsequent to the video frame corresponding to the behavior information for which a photo needs to be generated as the photo that needs to be generated. Optionally, the terminal device may configure a next adjacent video frame subsequent to the video frame corresponding to the behavior information for which a photo needs to be generated as the photo that needs to be generated.

Alternatively, the terminal device may configure a video frame that is at a next time point subsequent to the video frame corresponding to the behavior information for which a photo needs to be generated as the photo that needs to be generated.

For this embodiment of the present disclosure, the video frame subsequent to the video frame corresponding to the behavior information for which a photo needs to be generated is configured as the photo that needs to be generated, so that during video photographing, preparation time between a time point at which the behavior information for which a photo needs to be generated is presented and a time point at which photographing is actually performed can be provided for a photographed person, thereby improving user experience.

Figure 2:
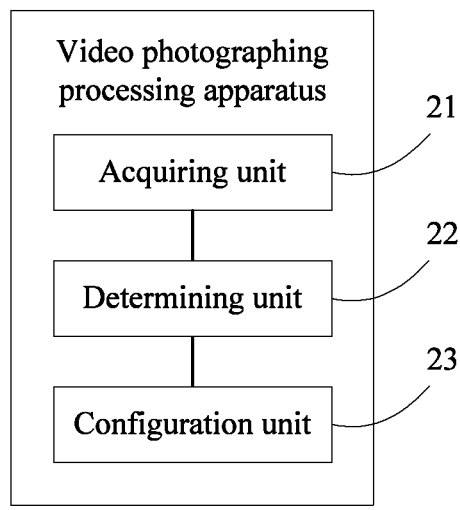
FIG. 2 is a schematic structural diagram of a video photographing processing apparatus according to Embodiment 1 of the present disclosure.

Further, as specific implementation of the method shown in FIG. 1, this embodiment of the present disclosure provides a video photographing processing apparatus. As shown in FIG. 2, an entity of the apparatus may be a terminal device, for example, a mobile phone, a tablet computer, a video camera, or a video recorder. The apparatus includes an acquiring unit 21, a determining unit 22, and a configuration unit 23.

The acquiring unit 21 is configured to acquire at least one piece of behavior information of a photographed person when a camera is turned on.

The camera described herein is a camera of the entity of the apparatus.

In one embodiment, when the camera is turned on, a video may be photographed, where the photographed video may be of any duration, and includes one or more video frames.

In another embodiment, when the camera is turned on, a photo may be taken. In another embodiment, when the camera is turned on, framing may be performed for photographing a video or for taking a photo.

The determining unit 22 is configured to determine whether behavior information for which a photo needs to be generated exists in the at least one piece of behavior information acquired by the acquiring unit 21.

The configuration unit 23 is configured to, when the determining unit 22 determines that the behavior information for which a photo needs to be generated exists in the at least one piece of behavior information, configure a target video frame as a photo that needs to be generated.

The target video frame is a video frame corresponding to the behavior information for which a photo needs to be generated, or any video frame subsequent to a video frame corresponding to the behavior information for which a photo needs to be generated.

It should be noted that, for other corresponding descriptions corresponding to function units in the video photographing processing apparatus provided in this embodiment of the present disclosure, reference may be made to corresponding descriptions in FIG. 1, and details are not described herein again.

Figure 3:
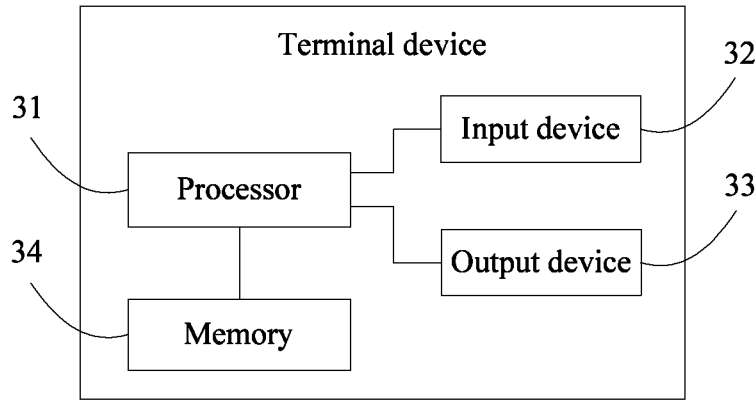
FIG. 3 is a schematic structural diagram of a terminal device according to Embodiment 1 of the present disclosure.

Still further, the entity of the video photographing processing apparatus may be a terminal device. As shown in FIG. 3, the terminal device may include a processor 31, an input device 32, an output device 33, and a memory 34, where the input device 32, the output device 33, and the memory 34 are separately connected to the processor 31.

The processor 31 is configured to acquire at least one piece of behavior information of a photographed person when a camera is turned on.

In one embodiment, when the camera is turned on, a photo may be taken or a video may be photographed. In another embodiment, when the camera is turned on, framing may be performed for photographing a video or for taking a photo.

The processor 31 is further configured to determine whether behavior information for which a photo needs to be generated exists in the at least one piece of behavior information.

The processor 31 is further configured to, if the behavior information for which a photo needs to be generated exists in the at least one piece of behavior information, configure a target video frame as a photo that needs to be generated.

The target video frame is a video frame corresponding to the behavior information for which a photo needs to be generated, or any video frame subsequent to a video frame corresponding to the behavior information for which a photo needs to be generated.

It should be noted that, for other corresponding descriptions corresponding to devices in the terminal device provided in this embodiment of the present disclosure, reference may be made to corresponding descriptions in FIG. 1, and details are not described herein again.

According to the video photographing processing method and apparatus provided in this embodiment of the present disclosure, when a camera is turned on, at least one piece of behavior information of a photographed person is acquired first, then it is determined whether behavior information for which a photo needs to be generated exists in the at least one piece of behavior information, and if the behavior information for which a photo needs to be generated exists in the at least one piece of behavior information, a target video frame is configured as a photo that needs to be generated. Compared with a current manner in which a photo that needs to be generated is selected using scores separately corresponding to video frames, in this embodiment of the present disclosure, when a camera is turned on, it is determined whether behavior information that is of a photographed person and for which a photo needs to be generated exists, so that a video frame can be selected according to a requirement of the photographed person for a photo, and therefore, accuracy of video frame selection can be improved.

Embodiment 2

Figure 4:
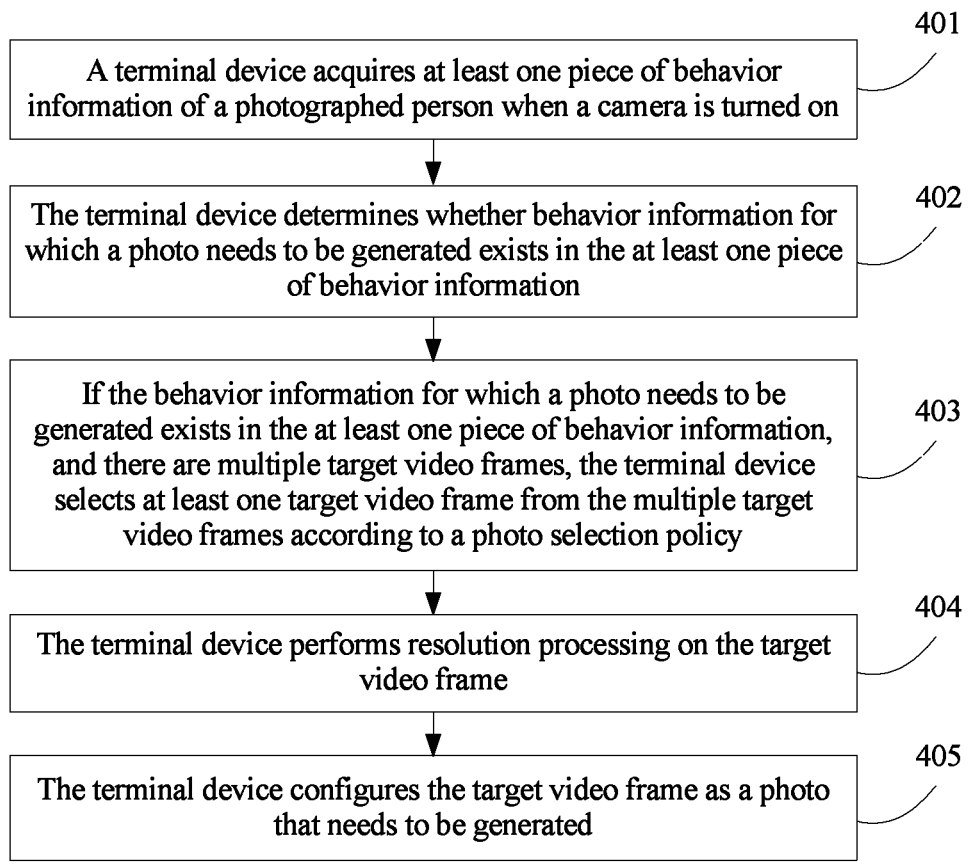
FIG. 4 is a flowchart of a video photographing processing method according to Embodiment 2 of the present disclosure.

This embodiment of the present disclosure provides a video photographing processing method, and as shown in FIG. 4, the method includes the following steps.

Step 401. A terminal device acquires at least one piece of behavior information of a photographed person when a camera is turned on.

In one embodiment, when the camera is turned on, a photo may be taken or a video may be photographed. In another embodiment, when the camera is turned on, framing may be performed for photographing a video or for taking a photo.

The photographed video may be of any duration, and includes one or more video frames.

For this embodiment of the present disclosure, the behavior information of the photographed person includes expression behavior information, voice behavior information, action behavior information, and the like. The expression behavior information may be: excited, delighted, surprised, annoyed, disgusted, angry, shy, scared, or the like; the voice behavior information may be: take a photo, wonderful, very beautiful, do not shoot, not pretty, or the like; and the action behavior information may be: an OK gesture, hands on hips, beckoning, or the like.

Step 402. The terminal device determines whether behavior information for which a photo needs to be generated exists in the at least one piece of behavior information.

The behavior information for which a photo needs to be generated is used for triggering generation of a photo. In this embodiment of the present disclosure, the behavior information that is of the photographed person and for which a photo needs to be generated is acquired, so that each video frame can be selected according to a requirement of the photographed person for a photo, and therefore, accuracy of video frame selection can be improved.

For this embodiment of the present disclosure, the behavior information that is of the photographed person and for which a photo needs to be taken includes expression information that is of the photographed person and for which a photo needs to be taken, voice information that is of the photographed person and for which a photo needs to be taken, and action information that is of the photographed person and for which a photo needs to be taken.

Optionally, step 402 may be the terminal determines whether the behavior information of the photographed person is the behavior information for which a photo needs to be taken, so as to determine whether the behavior information that is of the photographed person and for which a photo needs to be taken exists in the video frame.

In one aspect, the terminal device may first acquire change in eyes, eyebrows, the mouth, the nose, and facial muscles of the photographed person, then determine, according to an expression type corresponding to the change in the eyes, the eyebrows, the mouth, the nose, and the facial muscles of the photographed person, whether behavior information of the photographed person is the behavior information for which a photo needs to be taken, and finally, determine whether the behavior information that is of the photographed person and for which a photo needs to be taken exists in the video frame. For example, the expression type of the photographed person may be: excited, delighted, surprised, annoyed, disgusted, angry, shy, scared, or the like. Of these expression types, excited, delighted, surprised, and the like may be expression types for which a photo needs to be taken, and annoyed, disgusted, angry, shy, scared, and the like may be expression types that are of the photographed person and for which a photo does not need to be taken. When an expression type of the photographed person is "delighted", the terminal device determines that the expression type of the photographed person is a type for which a photo needs to be taken, and determines that the behavior information that is of the photographed person and for which a photo needs to be taken exists in a video frame corresponding to the expression type. When an expression type of the photographed person is "shy", the terminal device determines that the expression type of the photographed person is a type for which a photo does not need to be taken for the photographed person, and determines that the behavior information that is of the photographed person and for which a photo needs to be taken does not exist in a video frame corresponding to the expression type.

In another aspect, the terminal device may first detect and analyze voice information of the photographed person, then determine, according to the voice information of the photographed person, whether behavior information of the photographed person is the behavior information for which a photo needs to be taken, and finally, determine whether the behavior information that is of the photographed person and for which a photo needs to be taken exists in the video frame. For example, the voice information of the photographed person may be: take a photo, wonderful, very beautiful, nice, not pretty, very ugly, do not shoot, or the like. Of these pieces of voice information, take a photo, wonderful, very beautiful, nice, and the like may be voice information for which a photo needs to be taken, and not pretty, very ugly, do not shoot, and the like may be voice information that is of the photographed person and for which a photo does not need to be taken. When the voice information of the photographed person is "very beautiful", the terminal device determines that the behavior information of the photographed person is the behavior information for which a photo needs to be taken, and determines that the behavior information that is of the photographed person and for which a photo needs to be taken exists in a video frame corresponding to the voice information. When the voice information of the photographed person is "not pretty", the terminal device determines that the behavior information of the photographed person is behavior information for which a photo does not need to be taken, and determines that the behavior information that is of the photographed person and for which a photo needs to be taken does not exist in a video frame corresponding to the voice information.

In still another aspect, the terminal device may first detect and analyze an action type of the photographed person, then determine, according to the action type of the photographed person, whether behavior information of the photographed person is the behavior information for which a photo needs to be taken, and finally, determine whether the behavior information that is of the photographed person and for which a photo needs to be taken exists in the video frame. For example, the action type of the photographed person may be: thumbs up, an OK gesture, beckoning, shaking heads, waving hands, or the like. Of these action types, an action type for which a photo needs to be taken may be: thumbs up, an OK gesture, beckoning, or the like, and an action type that is of the photographed person and for which a photo does not need to be taken may be: shaking heads, waving hands, or the like. When the action type of the photographed person is an OK gesture, the terminal device determines that the behavior information of the photographed person is the behavior information for which a photo needs to be taken, and determines that the behavior information that is of the photographed person and for which a photo needs to be taken exists in a video frame corresponding to the action type. When the action type of the photographed person is shaking heads, the terminal device determines that the behavior information of the photographed person is behavior information for which a photo does not need to be taken, and determines that the behavior information that is of the photographed person and for which a photo needs to be taken does not exist in a video frame corresponding to the action type.

Alternatively, step 402 may be the terminal determines whether the behavior information of the photographed person matches preset behavior information, to determine whether the behavior information that is of the photographed person and for which a photo needs to be taken exists in the video frame. The preset behavior information may be preconfigured by the photographed person, and the preset behavior information may be: a preset expression type, preset voice information, a preset action type, and the like.

In one aspect, the terminal device may first acquire change in eyes, eyebrows, the mouth, the nose, and facial muscles of the photographed person, then determine, according to an expression type corresponding to the change in the eyes, the eyebrows, the mouth, the nose, and the facial muscles of the photographed person, whether an expression type of the photographed person matches a preset expression type, and finally, determine whether the behavior information that is of the photographed person and for which a photo needs to be taken exists in the video frame. For example, the preset expression type of the photographed person is "surprised". When the expression type of the photographed person matches "surprised", the terminal device determines that the expression type of the photographed person matches the preset expression type, and determines that a video frame corresponding to the expression type includes the behavior information that is of the photographed person and for which a photo needs to be taken; when the expression type of the photographed person does not match "surprised", the terminal device determines that the expression type of the photographed person does not match the preset expression type, and determines that the behavior information that is of the photographed person and for which a photo needs to be taken does not exist in a video frame corresponding to the expression type.

In another aspect, the terminal device may also first detect and analyze voice information of the photographed person, then determine whether the voice information of the photographed person matches preset voice information, and finally, determine whether the behavior information that is of the photographed person and for which a photo needs to be taken exists in the video frame. For example, the preset voice information of the photographed person is "take a photo". When the voice information of the photographed person matches "take a photo", the terminal device determines that the voice information of the photographed person matches the preset voice information, and determines that a video frame corresponding to the voice information includes the behavior information that is of the photographed person and for which a photo needs to be taken; when the voice information of the photographed person does not match "take a photo", the terminal device determines that the voice information of the photographed person does not match the preset voice information, and determines that the behavior information that is of the photographed person and for which a photo needs to be taken does not exist in a video frame corresponding to the voice information.

In still another aspect, the terminal device may also first detect and analyze an action type of the photographed person, then determine whether the action type of the photographed person matches a preset action type, and finally, determine whether the behavior information that is of the photographed person and for which a photo needs to be taken exists in the video frame. For example, the preset action type of the photographed person is "thumbs up". When the action type of the photographed person matches "thumbs up", the terminal device determines that the action type of the photographed person matches the preset action type, and determines that a video frame corresponding to the action type includes the behavior information that is of the photographed person and for which a photo needs to be taken; when the action type of the photographed person does not match "thumbs up", the terminal device determines that the action type of the photographed person does not match the preset action type, and determines that the behavior information that is of the photographed person and for which a photo needs to be taken does not exist in a video frame corresponding to the action type.

Step 403. If the behavior information for which a photo needs to be generated exists in the at least one piece of behavior information, and there are multiple target video frames, the terminal device selects at least one target video frame from the multiple target video frames according to a photo selection policy.

The target video frame is a video frame corresponding to the behavior information for which a photo needs to be generated, or any video frame subsequent to a video frame corresponding to the behavior information for which a photo needs to be generated.

For this embodiment of the present disclosure, the terminal device performs selection processing on the multiple target video frames, which can avoid a situation that excessive photos are generated, to further improve user experience.

The photo selection policy may be preconfigured by the terminal device, or may be configured by the photographed person, which is not limited in this embodiment of the present disclosure. In this embodiment of the present disclosure, the photo selection policy may be a photo selection policy corresponding to a photo effect, a quantity of photos, a difference degree of photos, photo content, photo quality, or the like.

In one aspect, when the terminal device performs selection in the multiple target video frames using a photo selection policy corresponding to a photo effect, the terminal device may select a photo with the best photo effect from multiple photos corresponding to a same scenario. For example, the terminal device may select a photo with the most smiling faces, the least closed eyes, the least background characters, or the most prominent object.

In another aspect, when the terminal device performs selection in the multiple target video frames using a photo selection policy corresponding to a quantity of photos, the terminal device may perform selection in the multiple target video frames according to a preset photo interval, a preset time interval, a preset selection quantity ratio, or the like. For example, the terminal device may select one photo from every thirty photos, the terminal device may select one photo every five minutes, or the terminal device may select 5% photos from the multiple target video frames.

In still another aspect, when the terminal device performs selection in the multiple target video frames using a photo selection policy corresponding to a photo similarity, the terminal device may select, from the multiple target video frames, photos with a relatively large similarity difference. For example, the terminal device may select, from the multiple target video frames, m photos with a relatively large similarity difference in photo content, or the terminal device may select, from the multiple target video frames, m photos with a relatively large time interval; where m is an integer greater than or equal to 1.

In yet another aspect, when the terminal device performs selection in the multiple target video frames using a photo selection policy corresponding to photo content, the terminal device may select, from the multiple target video frames, a photo that includes content required by a user. For example, the terminal device may select a photo that includes full body of a character from the multiple target video frames, the terminal device may select a photo that includes face close-up from the multiple target video frames, or the terminal device may select a photo that includes a front face of a character from the multiple target video frames.

In still another aspect, when the terminal device performs selection in the multiple target video frames using a photo selection policy corresponding to photo quality, the terminal device may select a photo with relatively high quality from the multiple target video frames. For example, for a landscape photo, the terminal device may select a photo that has proper composition, a clear image, and no sundries from the multiple target video frames; for a character photo, the terminal device may select a photo that has a front face, a smiling face, and no closed eyes from the multiple target video frames; and for a word photo, the terminal device may select a photo that has a clear word and a word in a proper size from the multiple target video frames.

For this embodiment of the present disclosure, the photo selection policy may be one photo selection policy in photo selection policies corresponding to a photo effect, a quantity of photos, a difference degree of photos, photo content, photo quality, and the like, or may be a combination of multiple photo selection policies in photo selection policies corresponding to a photo effect, a quantity of photos, a difference degree of photos, photo content, photo quality, and the like.

For this embodiment of the present disclosure, step 403 is an optional step.

Step 404. The terminal device performs resolution processing on the target video frame.

Further, resolution processing is performed on the target video frame, so that resolution of the target video frame can be improved.

For this embodiment of the present disclosure, if the target video frame is the video frame corresponding to the behavior information for which a photo needs to be generated, step 403 may be the terminal device performs resolution processing on the behavior information for which a photo needs to be generated; if the target video frame is any video frame subsequent to the video frame corresponding to the behavior information for which a photo needs to be generated, step 403 may be the terminal device performs resolution processing on any video frame subsequent to the video frame corresponding to the behavior information for which a photo needs to be generated.

Optionally, the terminal device may perform resolution processing on a next adjacent video frame subsequent to the video frame corresponding to the behavior information for which a photo needs to be generated.

Alternatively, the terminal device may perform resolution processing on a video frame that is at a next time point subsequent to the video frame corresponding to the behavior information for which a photo needs to be generated.

For this embodiment of the present disclosure, resolution processing is performed on the video frame subsequent to the video frame corresponding to the behavior information for which a photo needs to be generated, so that during video photographing, preparation time between a time point at which the behavior information for which a photo needs to be generated is presented and a time point at which photographing is actually performed can be provided for a photographed person, thereby improving user experience.

Optionally, step 404 may be, if the behavior information for which a photo needs to be generated exists in the at least one piece of behavior information, the terminal device performs resolution processing on the target video frame by means of upsampling processing. The upsampling processing may be used to improve resolution of the video frame.

For this embodiment of the present disclosure, resolution for the terminal device to perform video photographing is generally less than or equal to resolution for taking a photo, and therefore, performing resolution processing on the photo that needs to be generated can improve resolution of the photo that needs to be generated, so that user experience can be improved.

The photographed person may control the terminal device to perform resolution processing on the photo that needs to be generated, or the terminal device may automatically perform resolution processing on the photo that needs to be generated, which is not limited in this embodiment of the present disclosure. In this embodiment of the present disclosure, when the photographed person controls the terminal device to perform resolution processing on the photo that needs to be generated, the terminal device may provide multiple different types of resolution for the photographed person that performs photographing to select; when the terminal device automatically performs resolution processing on the photo that needs to be generated, the terminal device may perform, according to preset resolution, resolution processing on the photo that needs to be generated, where the preset resolution may be configured by the photographed person, or may be preconfigured by the terminal device, which is not limited in this embodiment of the present disclosure.

For this embodiment of the present disclosure, step 404 is an optional step.

Step 405. The terminal device configures the target video frame as a photo that needs to be generated.

The target video frame is a video frame corresponding to the behavior information for which a photo needs to be generated, or any video frame subsequent to a video frame corresponding to the behavior information for which a photo needs to be generated. In this embodiment of the present disclosure, if the target video frame is the video frame corresponding to the behavior information for which a photo needs to be generated, step 405 may be the terminal device configures the video frame corresponding to the behavior information for which a photo needs to be generated as the photo that needs to be generated; if the target video frame is any video frame subsequent to the video frame corresponding to the behavior information for which a photo needs to be generated, step 405 may be the terminal device configures any video frame subsequent to the video frame corresponding to the behavior information for which a photo needs to be generated as the photo that needs to be generated.

For this embodiment of the present disclosure, the any video frame subsequent to the video frame corresponding to the behavior information for which a photo needs to be generated may be a next adjacent video frame subsequent to the video frame corresponding to the behavior information for which a photo needs to be generated, or a video frame that is at a next time point subsequent to the video frame corresponding to the behavior information for which a photo needs to be generated.

Optionally, when the any video frame subsequent to the video frame corresponding to the behavior information for which a photo needs to be generated is the next adjacent video frame subsequent to the video frame corresponding to the behavior information for which a photo needs to be generated, the terminal device may configure the next adjacent video frame subsequent to the video frame corresponding to the behavior information for which a photo needs to be generated as the photo that needs to be generated.

Alternatively, when the any video frame subsequent to the video frame corresponding to the behavior information for which a photo needs to be generated is the video frame that is at the next time point subsequent to the video frame corresponding to the behavior information for which a photo needs to be generated, the terminal device may configure the video frame that is at the next time point subsequent to the video frame corresponding to the behavior information for which a photo needs to be generated as the photo that needs to be generated.

For this embodiment of the present disclosure, the video frame subsequent to the video frame corresponding to the behavior information for which a photo needs to be generated is configured as the photo that needs to be generated, so that during video photographing, preparation time between a time point at which the behavior information for which a photo needs to be generated is presented and a time point at which photographing is actually performed can be provided for a photographed person, thereby improving user experience.

Optionally, the terminal device may further configure a video frame that is a preset quantity of frames after the video frame corresponding to the behavior information for which a photo needs to be generated as the photo that needs to be generated. The preset quantity of frames may be preconfigured by the photographed person.

Alternatively, the terminal device may configure a video frame that is a preset time after the video frame corresponding to the behavior information for which a photo needs to be generated as the photo that needs to be generated. The preset time may be preconfigured by the photographed person.

For this embodiment of the present disclosure, the any video frame subsequent to the video frame corresponding to the behavior information for which a photo needs to be generated is determined according to the preset quantity of frames or the preset time preconfigured by the photographed person, so that required preparation time between a time point at which the behavior information for which a photo needs to be generated is presented and a time point at which photographing is actually performed can be provided for the photographed person, thereby improving user experience.

Figure 5:
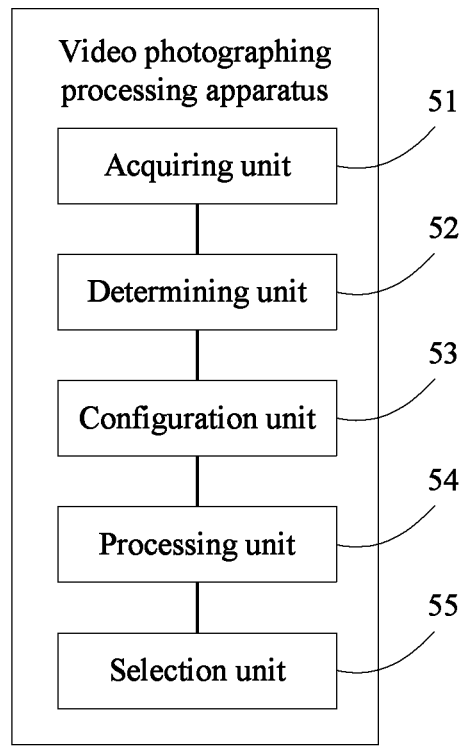
FIG. 5 is a schematic structural diagram of a video photographing processing apparatus according to Embodiment 2 of the present disclosure.

Further, as specific implementation of the method shown in FIG. 4, this embodiment of the present disclosure provides a video photographing processing apparatus. As shown in FIG. 5, an entity of the apparatus may be a terminal device, for example, a mobile phone, a tablet computer, a video camera, or a video recorder. The apparatus includes an acquiring unit 51, a determining unit 52, and a configuration unit 53.

The acquiring unit 51 is configured to acquire at least one piece of behavior information of a photographed person when a camera is turned on.

In one embodiment, when the camera is turned on, a photo may be taken or a video may be photographed. In another embodiment, when the camera is turned on, framing may be performed for photographing a video or for taking a photo.

The determining unit 52 is configured to determine whether behavior information for which a photo needs to be generated exists in the at least one piece of behavior information acquired by the acquiring unit 51.

The configuration unit 53 is configured to, when the determining unit 52 determines that the behavior information for which a photo needs to be generated exists in the at least one piece of behavior information, configure a target video frame as a photo that needs to be generated.

The target video frame is a video frame corresponding to the behavior information for which a photo needs to be generated, or any video frame subsequent to a video frame corresponding to the behavior information for which a photo needs to be generated.

The behavior information acquired by the acquiring unit 51 includes expression behavior information, voice behavior information, and action behavior information.

Optionally, the apparatus may further include a processing unit 54.

The processing unit 54 is configured to perform resolution processing on the target video frame, to improve resolution of the target video frame.

The configuration unit 53 is configured to configure the target video frame on which the processing unit 54 performs resolution processing as the photo that needs to be generated.

Optionally, the apparatus may further include a selection unit 55.

The selection unit 55 is configured to, when there are multiple target video frames, select at least one target video frame from the multiple target video frames according to a photo selection policy.

The configuration unit 53 is configured to configure, as the photo that needs to be generated, the at least one target video frame selected by the selection unit 55.

The any video frame subsequent to the video frame corresponding to the behavior information for which a photo needs to be generated is a next adjacent video frame subsequent to the video frame corresponding to the behavior information for which a photo needs to be generated, or a video frame that is at a next time point subsequent to the video frame corresponding to the behavior information for which a photo needs to be generated.

It should be noted that, for other corresponding descriptions corresponding to function units in the video photographing processing apparatus provided in this embodiment of the present disclosure, reference may be made to corresponding descriptions in FIG. 4, and details are not described herein again.

Figure 6:
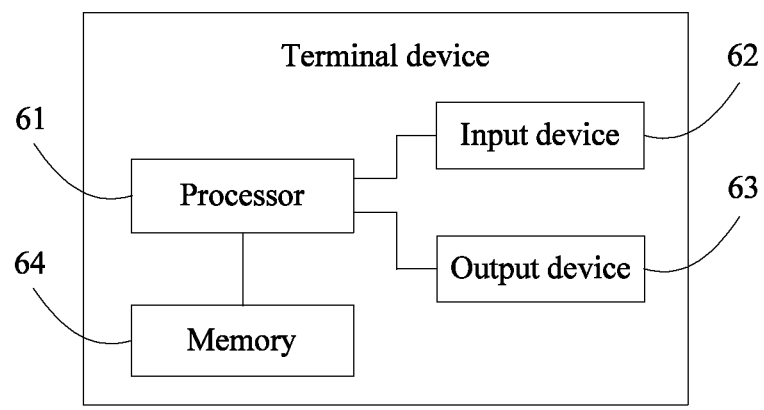
FIG. 6 is a schematic structural diagram of a terminal device according to Embodiment 2 of the present disclosure.

Still further, the entity of the video photographing processing apparatus may be a terminal device. As shown in FIG. 6, the terminal device may include a processor 61, an input device 62, an output device 63, and a memory 64, where the input device 62, the output device 63, and the memory 64 are separately connected to the processor 61.

The processor 61 is configured to acquire at least one piece of behavior information of a photographed person when a camera is turned on.

In one embodiment, when the camera is turned on, a photo may be taken or a video may be photographed. In another embodiment, when the camera is turned on, framing may be performed for photographing a video or for taking a photo.

The processor 61 is further configured to determine whether behavior information for which a photo needs to be generated exists in the at least one piece of behavior information.

The processor 61 is further configured to, if the behavior information for which a photo needs to be generated exists in the at least one piece of behavior information, configure a target video frame as a photo that needs to be generated.

The target video frame is a video frame corresponding to the behavior information for which a photo needs to be generated, or any video frame subsequent to a video frame corresponding to the behavior information for which a photo needs to be generated.

The behavior information acquired by the processor 61 includes expression behavior information, voice behavior information, and action behavior information.

The processor 61 is further configured to perform resolution processing on the target video frame, to improve resolution of the target video frame.

The processor 61 is further configured to configure the target video frame on which resolution processing is performed as the photo that needs to be generated.

The processor 61 is further configured to, when there are multiple target video frames, select at least one target video frame from the multiple target video frames according to a photo selection policy.

The processor 61 is further configured to configure the at least one target video frame as the photo that needs to be generated.

The any video frame subsequent to the video frame corresponding to the behavior information for which a photo needs to be generated is a next adjacent video frame subsequent to the video frame corresponding to the behavior information for which a photo needs to be generated, or a video frame that is at a next time point subsequent to the video frame corresponding to the behavior information for which a photo needs to be generated.

It should be noted that, for other corresponding descriptions corresponding to devices in the terminal device provided in this embodiment of the present disclosure, reference may be made to corresponding descriptions in FIG. 4, and details are not described herein again.

According to the video photographing processing method and apparatus provided in this embodiment of the present disclosure, when a camera is turned on, at least one piece of behavior information of a photographed person is acquired first, then it is determined whether behavior information for which a photo needs to be generated exists in the at least one piece of behavior information, and if the behavior information for which a photo needs to be generated exists in the at least one piece of behavior information, a target video frame is configured as a photo that needs to be generated. Compared with a current manner in which a photo that needs to be generated is selected using scores separately corresponding to video frames, in this embodiment of the present disclosure, when a camera is turned on, it is determined whether behavior information that is of a photographed person and for which a photo needs to be generated exists, so that a video frame can be selected according to a requirement of the photographed person for a photo, and therefore, accuracy of video frame selection can be improved.

Embodiment 3

Figure 7:
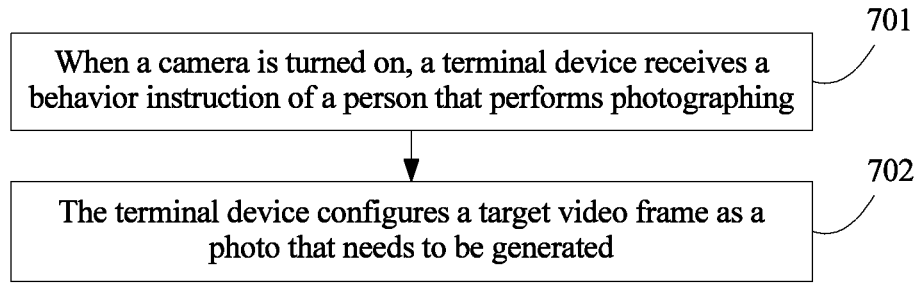
FIG. 7 is a flowchart of a video photographing processing method according to Embodiment 3 of the present disclosure.

This embodiment of the present disclosure provides a video photographing processing method, and as shown in FIG. 7, the method includes the following steps.

Step 701. When a camera is turned on, a terminal device receives a behavior instruction of a person that performs photographing.

The behavior instruction is used to instruct to generate a photo.

Step 702. The terminal device configures a target video frame as a photo that needs to be generated.

The target video frame is a video frame corresponding to the behavior instruction or any video frame subsequent to a video frame corresponding to the behavior instruction. In this embodiment of the present disclosure, if the target video frame is the video frame corresponding to the behavior instruction, step 702 may be the terminal device configures the video frame corresponding to the behavior instruction as the photo that needs to be generated; if the target video frame is any video frame subsequent to the video frame corresponding to the behavior instruction, step 702 may be the terminal device configures any video frame subsequent to the video frame corresponding to the behavior instruction as the photo that needs to be generated.

Optionally, the terminal device may configure a next adjacent video frame subsequent to the video frame corresponding to the behavior instruction as the photo that needs to be generated.

Alternatively, the terminal device may configure a video frame that is at a next time point subsequent to the video frame corresponding to the behavior instruction as the photo that needs to be generated.

For this embodiment of the present disclosure, the video frame subsequent to the video frame corresponding to the behavior instruction is configured as the photo that needs to be generated, so that during video photographing, preparation time between a time point at which the behavior instruction is presented and a time point at which photographing is actually performed can be provided for a photographed person, thereby improving user experience.

Figure 8:
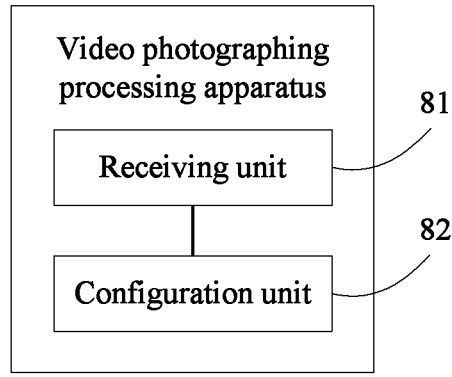
FIG. 8 is a schematic structural diagram of a video photographing processing apparatus according to Embodiment 3 of the present disclosure.

Further, as specific implementation of the method shown in FIG. 7, this embodiment of the present disclosure provides a video photographing processing apparatus. As shown in FIG. 8, an entity of the apparatus may be a terminal device, for example, a mobile phone, a tablet computer, a video camera, or a video recorder. The apparatus includes a receiving unit 81 and a configuration unit 82.

The receiving unit 81 is configured to, when a camera is turned on, receive a behavior instruction of a person that performs photographing.

In one embodiment, when the camera is turned on, a photo may be taken or a video may be photographed. In another embodiment, when the camera is turned on, framing may be performed for photographing a video or for taking a photo.

The behavior instruction is used to instruct to generate a photo.

The configuration unit 82 is configured to configure a target video frame as a photo that needs to be generated. The target video frame is a video frame corresponding to the behavior instruction received by the receiving unit 81 or any video frame subsequent to a video frame corresponding to the behavior instruction.

It should be noted that, for other corresponding descriptions corresponding to function units in the video photographing processing apparatus provided in this embodiment of the present disclosure, reference may be made to corresponding descriptions in FIG. 7, and details are not described herein again.

Figure 9:
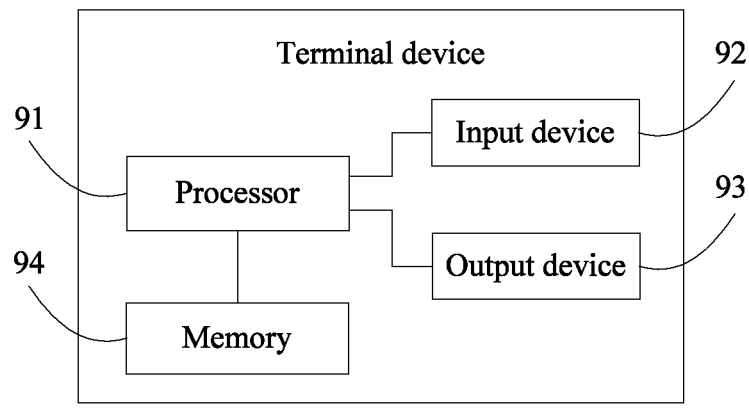
FIG. 9 is a schematic structural diagram of a terminal device according to Embodiment 3 of the present disclosure.

Still further, the entity of the video photographing processing apparatus may be a terminal device. As shown in FIG. 9, the terminal device may include a processor 91, an input device 92, an output device 93, and a memory 94, where the input device 92, the output device 93, and the memory 94 are separately connected to the processor 91.

The processor 91 is configured to, when a camera is turned on, receive a behavior instruction of a person that performs photographing.

The behavior instruction is used to instruct to generate a photo.

The processor 91 is further configured to configure a target video frame as a photo that needs to be generated.

The target video frame is a video frame corresponding to the behavior instruction or any video frame subsequent to a video frame corresponding to the behavior instruction.

It should be noted that, for other corresponding descriptions corresponding to devices in the terminal device provided in this embodiment of the present disclosure, reference may be made to corresponding descriptions in FIG. 7, and details are not described herein again.

According to the video photographing processing method and apparatus provided in this embodiment of the present disclosure, when a camera is turned on, a behavior instruction of a person that performs photographing is received first, and then a target video frame is configured as a photo that needs to be generated. Compared with a current manner in which a photo that needs to be generated is selected using scores separately corresponding to video frames, in this embodiment of the present disclosure, when a camera is turned on, a behavior instruction of a person that performs photographing is received, so that a video frame can be selected according to a requirement that is for a photo and that is of the person that performs photographing, and therefore, accuracy of video frame selection can be improved.

Embodiment 4

Figure 10:
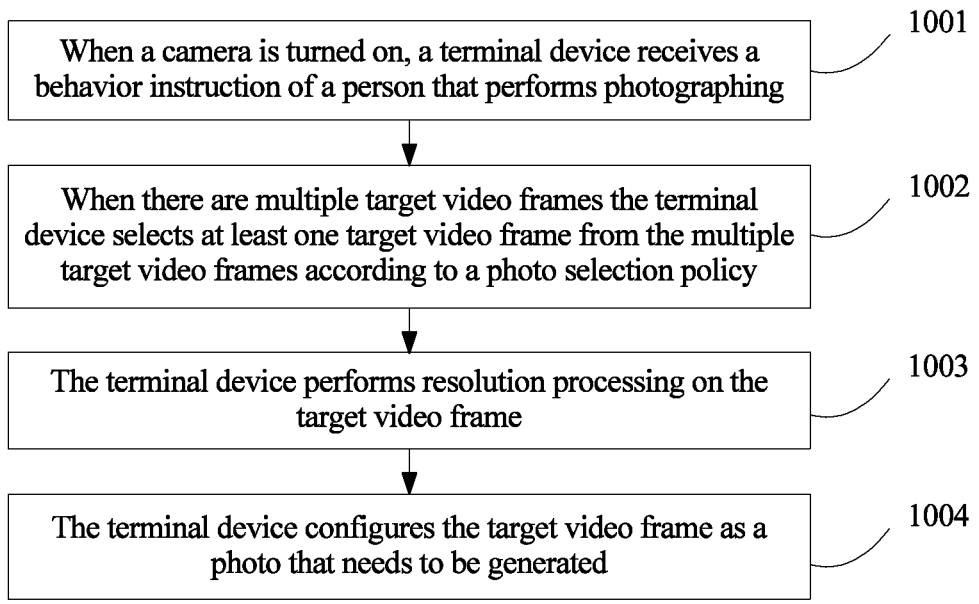
FIG. 10 is a flowchart of a video photographing processing method according to Embodiment 4 of the present disclosure.

This embodiment of the present disclosure provides a video photographing processing method, and as shown in FIG. 10, the method includes the following steps.

Step 1001. When a camera is turned on, a terminal device receives a behavior instruction of a person that performs photographing.

The behavior instruction is used to instruct to generate a photo. In this embodiment of the present disclosure, the behavior instruction of the person that performs photographing is received, so that each video frame can be selected according to a requirement that is for a photo and that is of the person that performs photographing, and therefore, accuracy of video frame selection can be improved.

For this embodiment of the present disclosure, the behavior instruction includes an expression behavior instruction, a voice behavior instruction, and an action behavior instruction. The expression behavior instruction may be: surprised, excited, delighted, or the like; the voice behavior instruction may be: shoot, take a photo, wonderful, very beautiful, or the like; and the action behavior instruction may be: tapping a screen, sliding on a screen, thumbs up, or the like.

Optionally, step 1001 may be the terminal device determines whether a behavior of the person that performs photographing is the behavior instruction, to receive the behavior instruction of the person that performs photographing.

In one aspect, the terminal device may first acquire change in eyes, eyebrows, the mouth, the nose, and facial muscles of the person that performs photographing, then determine, according to an expression type corresponding to the change in the eyes, the eyebrows, the mouth, the nose, and the facial muscles that are of the person that performs photographing, whether the behavior of the person that performs photographing is the behavior instruction, and finally, determine whether to receive the behavior instruction of the person that performs photographing. For example, a behavior instruction of an expression type of the person that performs photographing may be: surprised, excited, delighted, or the like. When learning that the expression type of the person that performs photographing is "delighted", the terminal device determines that the expression type of the person that performs photographing is the behavior instruction, and determines to receive the behavior instruction of the person that performs photographing.

In another aspect, the terminal device may first detect and analyze voice information of the person that performs photographing, then determine, according to the voice information of person that performs photographing, whether the behavior of the person that performs photographing is the behavior instruction, and finally, determine whether to receive the behavior instruction of the person that performs photographing. For example, a voice behavior instruction of the person that performs photographing may be: take a photo, wonderful, very beautiful, nice, or the like. When learning that the voice information of the person that performs photographing is "very beautiful", the terminal device determines that the voice information of the person that performs photographing is the behavior instruction, and determines to receive the behavior instruction of the person that performs photographing.

In still another aspect, the terminal device may first detect and analyze an action type of the person that performs photographing, then determine, according to the action type of the person that performs photographing, whether the behavior of the person that performs photographing is the behavior instruction, and finally, determine whether to receive the behavior instruction of the person that performs photographing. For example, an action behavior instruction of the person that performs photographing may be: thumbs up, an OK gesture, beckoning, or the like. When learning that the action type of the person that performs photographing is an OK gesture, the terminal device determines that the action type of the person that performs photographing is the behavior instruction, and determines to receive the behavior instruction of the person that performs photographing.

Alternatively, step 1001 may be the terminal device determines whether a behavior of the person that performs photographing matches a preset behavior instruction, to receive the behavior instruction of the person that performs photographing. The preset behavior instruction may be preconfigured by the person that performs photographing, and the preset behavior instruction may be: a preset expression behavior instruction, a preset voice behavior instruction, a preset action behavior instruction, or the like.

In one aspect, the terminal device may first acquire, according to change in eyes, eyebrows, the mouth, the nose, and facial muscles of the person that performs photographing, an expression type of the person that performs photographing, then determine whether the expression type of the person that performs photographing matches the preset expression behavior instruction, and finally, receive the behavior instruction of the person that performs photographing. For example, the preset expression behavior instruction of the person that performs photographing is "surprised". When the expression type of the person that performs photographing matches "surprised", the terminal device determines that the expression type of the person that performs photographing matches the preset expression behavior instruction, and determines to receive the behavior instruction of the person that performs photographing.

In another aspect, the terminal device may further first detect and analyze voice information of the person that performs photographing, then determine whether the voice information of the person that performs photographing matches the preset voice behavior instruction, and finally, receive the behavior instruction of the person that performs photographing. For example, the preset voice behavior instruction of the person that performs photographing is "take a photo". When the voice information of the person that performs photographing matches "take a photo", the terminal device determines that the voice information of the person that performs photographing matches the preset voice behavior instruction, and determines to receive the behavior instruction of the person that performs photographing.

In still another aspect, the terminal device may further first detect and analyze an action type of the person that performs photographing, then determine whether the action type of the person that performs photographing matches the preset action behavior instruction, and finally, receive the behavior instruction of the person that performs photographing. For example, the preset action behavior instruction of the person that performs photographing is "tapping a screen". When the action type of the person that performs photographing matches "tapping a screen", the terminal device determines that the action type of the person that performs photographing matches the preset action behavior instruction, and determines to receive the behavior instruction of the person that performs photographing.

Step 1002. When there are multiple target video frames, the terminal device selects at least one target video frame from the multiple target video frames according to a photo selection policy.

The target video frame is a video frame corresponding to the behavior instruction or any video frame subsequent to a video frame corresponding to the behavior instruction.

For this embodiment of the present disclosure, the terminal device performs selection processing on the multiple target video frames, which can avoid a situation that excessive photos are generated, to further improve user experience.

The photo selection policy may be preconfigured by the terminal device, or may be configured by the person that performs photographing, which is not limited in this embodiment of the present disclosure. In this embodiment of the present disclosure, the photo selection policy may be a photo selection policy corresponding to a photo effect, a quantity of photos, a difference degree of photos, photo content, photo quality, or the like.

In one aspect, when the terminal device performs selection in the multiple target video frames using a photo selection policy corresponding to a photo effect, the terminal device may select a photo with the best photo effect from multiple photos corresponding to a same scenario. For example, the terminal device may select a photo with the most smiling faces, the least closed eyes, the least background characters, or the most prominent object.

In another aspect, when the terminal device performs selection in the multiple target video frames using a photo selection policy corresponding to a quantity of photos, the terminal device may perform selection in the multiple target video frames according to a preset photo interval, a preset time interval, a preset selection quantity ratio, or the like. For example, the terminal device may select one photo from every thirty photos, the terminal device may select one photo every five minutes, or the terminal device may select 5% photos from the multiple target video frames.

In still another aspect, when the terminal device performs selection in the multiple target video frames using a photo selection policy corresponding to a photo similarity, the terminal device may select, from the multiple target video frames, photos with a relatively large similarity difference. For example, the terminal device may select, from the multiple target video frames, m photos with a relatively large similarity difference in photo content, or the terminal device may select, from the multiple target video frames, m photos with a relatively large time interval; where m is an integer greater than or equal to 1.

In yet another aspect, when the terminal device performs selection in the multiple target video frames using a photo selection policy corresponding to photo content, the terminal device may select, from the multiple target video frames, a photo that includes content required by a user. For example, the terminal device may select a photo that includes full body of a character from the multiple target video frames, the terminal device may select a photo that includes face close-up from the multiple target video frames, or the terminal device may select a photo that includes a front face of a character from the multiple target video frames.

In still another aspect, when the terminal device performs selection in the multiple target video frames using a photo selection policy corresponding to photo quality, the terminal device may select a photo with relatively high quality from the multiple target video frames. For example, for a landscape photo, the terminal device may select a photo that has proper composition, a clear image, and no sundries from the multiple target video frames; for a character photo, the terminal device may select a photo that has a front face, a smiling face, and no closed eyes from the multiple target video frames; and for a word photo, the terminal device may select a photo that has a clear word and a word in a proper size from the multiple target video frames.

For this embodiment of the present disclosure, the photo selection policy may be one photo selection policy in photo selection policies corresponding to a photo effect, a quantity of photos, a difference degree of photos, photo content, photo quality, and the like, or may be a combination of multiple photo selection policies in photo selection policies corresponding to a photo effect, a quantity of photos, a difference degree of photos, photo content, photo quality, and the like.

For this embodiment of the present disclosure, step 1002 is an optional step.

Step 1003. The terminal device performs resolution processing on the target video frame.

Further, resolution processing is performed on the target video frame, so that resolution of the target video frame can be improved.

For this embodiment of the present disclosure, if the target video frame is the video frame corresponding to the behavior instruction, step 1003 may be the terminal device performs resolution processing on the video frame corresponding to the behavior instruction; if the target video frame is any video frame subsequent to the video frame corresponding to the behavior instruction, step 1003 may be the terminal device performs resolution processing on any video frame subsequent to the video frame corresponding to the behavior instruction.

Optionally, the terminal device may perform resolution processing on a next adjacent video frame subsequent to the video frame corresponding to the behavior instruction.

Alternatively, the terminal device may perform resolution processing on a video frame that is at a next time point subsequent to the video frame corresponding to the behavior instruction.

For this embodiment of the present disclosure, resolution processing is performed on the video frame subsequent to the video frame corresponding to the behavior instruction, so that during video photographing, preparation time between a time point at which the behavior instruction is presented and a time point at which photographing is actually performed can be provided for a person that performs photographing, thereby improving user experience.

Optionally, step 1003 may be the terminal device performs resolution processing on the target video frame by means of upsampling processing. The upsampling processing may be used to improve resolution of the video frame.

For this embodiment of the present disclosure, resolution for the terminal device to perform video photographing is generally less than or equal to resolution for taking a photo, and therefore, performing resolution processing on the photo that needs to be generated can improve resolution of the photo that needs to be generated, so that user experience can be improved.

The person that performs photographing may control the terminal device to perform resolution processing on the photo that needs to be generated, or the terminal device may automatically perform resolution processing on the photo that needs to be generated, which is not limited in this embodiment of the present disclosure. In this embodiment of the present disclosure, when the person that performs photographing controls the terminal device to perform resolution processing on the photo that needs to be generated, the terminal device may provide multiple different types of resolution for the person that performs photographing to select; when the terminal device automatically performs resolution processing on the photo that needs to be generated, the terminal device may perform, according to preset resolution, resolution processing on the photo that needs to be generated, where the preset resolution may be configured by the person that performs photographing, or may be preconfigured by the terminal device, which is not limited in this embodiment of the present disclosure.

For this embodiment of the present disclosure, step 1003 is an optional step.

Step 1004. The terminal device configures the target video frame as a photo that needs to be generated.

The target video frame is a video frame corresponding to the behavior instruction or any video frame subsequent to a video frame corresponding to the behavior instruction. In this embodiment of the present disclosure, if the target video frame is the video frame corresponding to the behavior instruction, step 1004 may be the terminal device configures the video frame corresponding to the behavior instruction as the photo that needs to be generated; if the target video frame is any video frame subsequent to the video frame corresponding to the behavior instruction, step 1004 may be the terminal device configures any video frame subsequent to the video frame corresponding to the behavior instruction as the photo that needs to be generated.

For this embodiment of the present disclosure, the any video frame subsequent to the video frame corresponding to the behavior instruction is a next adjacent video frame subsequent to the video frame corresponding to the behavior instruction or a video frame that is at a next time point subsequent to the video frame corresponding to the behavior instruction.

Optionally, when the any video frame subsequent to the video frame corresponding to the behavior instruction is the next adjacent video frame subsequent to the video frame corresponding to the behavior instruction, the terminal device may configure the next adjacent video frame subsequent to the video frame corresponding to the behavior instruction as the photo that needs to be generated.

Alternatively, when the any video frame subsequent to the video frame corresponding to the behavior instruction is the video frame that is at the next time point subsequent to the video frame corresponding to the behavior instruction, the terminal device may configure the video frame that is at the next time point subsequent to the video frame corresponding to the behavior instruction as the photo that needs to be generated.

For this embodiment of the present disclosure, the video frame subsequent to the video frame corresponding to the behavior instruction is configured as the photo that needs to be generated, so that during video photographing, preparation time between a time point at which the behavior instruction is presented and a time point at which photographing is actually performed can be provided for the person that performs photographing, thereby improving user experience.

Optionally, the terminal device may further configure a video frame that is a preset quantity of frames after the video frame corresponding to the behavior instruction as the photo that needs to be generated. The preset quantity of frames may be preconfigured by the person that performs photographing.

Alternatively, the terminal device may configure a video frame that is a preset time after the video frame corresponding to the behavior instruction as the photo that needs to be generated. The preset time may be preconfigured by the person that performs photographing.

For this embodiment of the present disclosure, the any video frame subsequent to the video frame corresponding to the behavior information for which a photo needs to be generated is determined according to the preset quantity of frames or the preset time preconfigured by the person that performs photographing, so that required preparation time between a time point at which the behavior information for which a photo needs to be generated is presented and a time point at which photographing is actually performed can be provided for the person that performs photographing, thereby improving user experience.

Figure 11:
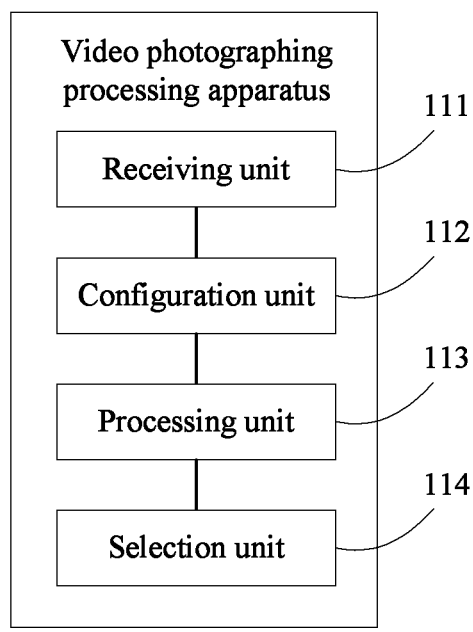
FIG. 11 is a schematic structural diagram of a video photographing processing apparatus according to Embodiment 4 of the present disclosure.

Further, as specific implementation of the method shown in FIG. 10, this embodiment of the present disclosure provides a video photographing processing apparatus. As shown in FIG. 11, an entity of the apparatus may be a terminal device, for example, a mobile phone, a tablet computer, a video camera, or a video recorder. The apparatus includes a receiving unit 111 and a configuration unit 112.

The receiving unit 111 is configured to, when a camera is turned on, receive a behavior instruction of a person that performs photographing.

The behavior instruction is used to instruct to generate a photo.

The configuration unit 112 is configured to configure a target video frame as a photo that needs to be generated.

The target video frame is a video frame corresponding to the behavior instruction received by the receiving unit 111 or any video frame subsequent to a video frame corresponding to the behavior instruction.

The behavior instruction received by the receiving unit 111 includes an expression behavior instruction, a voice behavior instruction, and an action behavior instruction.

Optionally, the apparatus may further include a processing unit 113.

The processing unit 113 is configured to perform resolution processing on the target video frame corresponding to the behavior instruction, to improve resolution of the target video frame.

The configuration unit 112 is configured to configure the target video frame on which the processing unit 113 performs resolution processing as the photo that needs to be generated.

Optionally, the apparatus may further include a selection unit 114.

The selection unit 114 is configured to, when there are multiple target video frames, select at least one target video frame from the multiple target video frames according to a photo selection policy.

The configuration unit 112 is configured to configure, as the photo that needs to be generated, the at least one target video frame selected by the selection unit 114.

For this embodiment of the present disclosure, the any video frame subsequent to the video frame corresponding to the behavior instruction is a next adjacent video frame subsequent to the video frame corresponding to the behavior instruction or a video frame that is at a next time point subsequent to the video frame corresponding to the behavior instruction.

It should be noted that, for other corresponding descriptions corresponding to function units in the video photographing processing apparatus provided in this embodiment of the present disclosure, reference may be made to corresponding descriptions in FIG. 10, and details are not described herein again.

Figure 12:
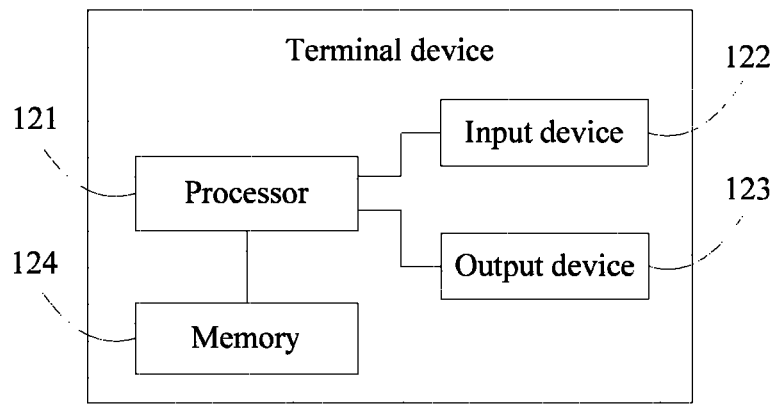
FIG. 12 is a schematic structural diagram of a terminal device according to Embodiment 4 of the present disclosure.

Still further, the entity of the video photographing processing apparatus may be a terminal device. As shown in FIG. 12, the terminal device may include a processor 121, an input device 122, an output device 123, and a memory 124, where the input device 122, the output device 123, and the memory 124 are separately connected to the processor 121.

The processor 121 is configured to, when a camera is turned on, receive a behavior instruction of a person that performs photographing.

The behavior instruction is used to instruct to generate a photo.

The processor 121 is further configured to configure a target video frame as a photo that needs to be generated.

The target video frame is a video frame corresponding to the behavior instruction or any video frame subsequent to a video frame corresponding to the behavior instruction.

The behavior instruction received by the processor 121 includes an expression behavior instruction, a voice behavior instruction, and an action behavior instruction.

The processor 121 is further configured to perform resolution processing on the target video frame corresponding to the behavior instruction, to improve resolution of the target video frame.

The processor 121 is further configured to configure the target video frame on which resolution processing is performed as the photo that needs to be generated.

The processor 121 is further configured to, when there are multiple target video frames, select at least one target video frame from the multiple target video frames according to a photo selection policy.

The processor 121 is further configured to configure the selected at least one target video frame as the photo that needs to be generated.

It should be noted that, for other corresponding descriptions corresponding to devices in the terminal device provided in this embodiment of the present disclosure, reference may be made to corresponding descriptions in FIG. 10, and details are not described herein again.

For this embodiment of the present disclosure, the any video frame subsequent to the video frame corresponding to the behavior instruction is a next adjacent video frame subsequent to the video frame corresponding to the behavior instruction or a video frame that is at a next time point subsequent to the video frame corresponding to the behavior instruction.

According to the video photographing processing method and apparatus provided in this embodiment of the present disclosure, when a camera is turned on, a behavior instruction of a person that performs photographing is received first, and then a target video frame is configured as a photo that needs to be generated. Compared with a current manner in which a photo that needs to be generated is selected using scores separately corresponding to video frames, in this embodiment of the present disclosure, when a camera is turned on, a behavior instruction of a person that performs photographing is received, so that a video frame can be selected according to a requirement that is for a photo and that is of the person that performs photographing, and therefore, accuracy of video frame selection can be improved.

Embodiment 5

Figure 13:
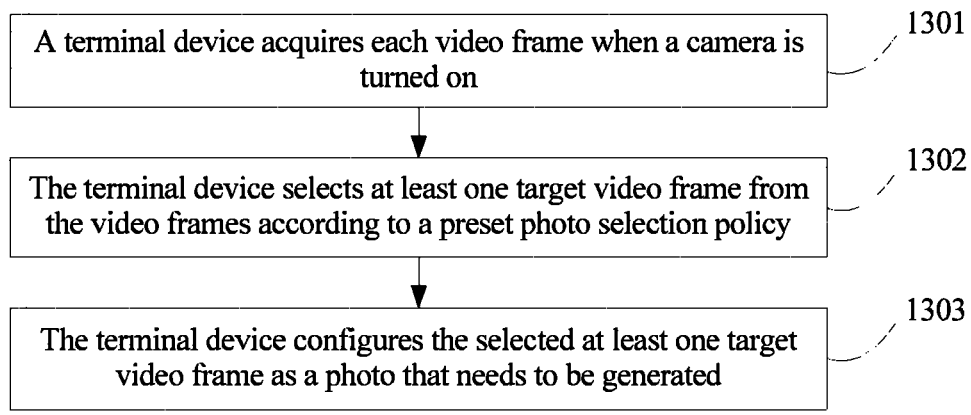
FIG. 13 is a flowchart of a video photographing processing method according to Embodiment 5 of the present disclosure.

This embodiment of the present disclosure provides a video photographing processing method, and as shown in FIG. 13, the method includes the following steps.

Step 1301. A terminal device acquires each video frame when a camera is turned on.

Step 1302. The terminal device selects at least one target video frame from the video frames according to a preset photo selection policy.

For this embodiment of the present disclosure, the at least one target video frame is selected from the video frames, so that during video photographing, the terminal device can automatically generate a photo that needs to be generated, thereby improving user experience.

The preset photo selection policy may be preconfigured by the terminal device. In this embodiment of the present disclosure, the preset photo selection policy may be a photo selection policy corresponding to a photo effect, a quantity of photos, a difference degree of photos, photo content, photo quality, or the like.

In one aspect, when the terminal device selects the at least one target video frame from the video frames using a photo selection policy corresponding to a photo effect, the terminal device may select a photo with the best photo effect from multiple photos corresponding to a same scenario. For example, the terminal device may select a photo with the most smiling faces, the least closed eyes, the least background characters, or the most prominent object.

In another aspect, when the terminal device selects the at least one target video frame from the video frames using a photo selection policy corresponding to a quantity of photos, the terminal device may perform selection in the multiple target video frames according to a preset photo interval, a preset time interval, a preset selection quantity ratio, or the like. For example, the terminal device may select one photo from every fifty photos, the terminal device may select one photo every three minutes, or the terminal device may select 8% photos from the multiple target video frames.

In still another aspect, when the terminal device selects the at least one target video frame from the video frames using a photo selection policy corresponding to a photo similarity, the terminal device may select, from the multiple target video frames, a photo with a relatively large similarity difference. For example, the terminal device may select, from the multiple target video frames, m photos with a relatively large similarity difference in photo content, or the terminal device may select, from the multiple target video frames, m photos with a relatively large time interval; where m is an integer greater than or equal to 1.

In yet another aspect, when the terminal device selects the at least one target video frame from the video frames using a photo selection policy corresponding to photo content, the terminal device may select, from the multiple target video frames, a photo that includes content required by a user. For example, the terminal device may select a photo that includes full body of a character from the multiple target video frames, the terminal device may select a photo that includes face close-up from the multiple target video frames, or the terminal device may select a photo that includes a front face of a character from the multiple target video frames.

In still another aspect, when the terminal device selects the at least one target video frame from the video frames using a photo selection policy corresponding to photo quality, the terminal device may select a photo with relatively high quality from the multiple target video frames. For example, for a landscape photo, the terminal device may select a photo that has proper composition, a clear image, and no sundries from the multiple target video frames; for a character photo, the terminal device may select a photo that has a front face, a smiling face, and no closed eyes from the multiple target video frames; and for a word photo, the terminal device may select a photo that has a clear word and a word in a proper size from the multiple target video frames.

For this embodiment of the present disclosure, the preset photo selection policy may be one photo selection policy in photo selection policies corresponding to a photo effect, a quantity of photos, a difference degree of photos, photo content, photo quality, and the like, or may be a combination of multiple photo selection policies in photo selection policies corresponding to a photo effect, a quantity of photos, a difference degree of photos, photo content, photo quality, and the like.

Step 1303. The terminal device configures the selected at least one target video frame as a photo that needs to be generated.

Figure 14:
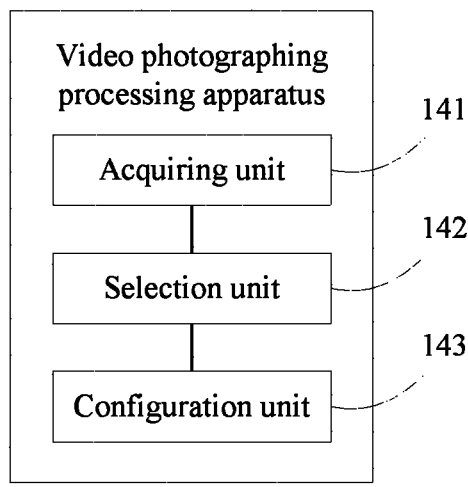
FIG. 14 is a schematic structural diagram of a video photographing processing apparatus according to Embodiment 5 of the present disclosure.

Further, as specific implementation of the method shown in FIG. 13, this embodiment of the present disclosure provides a video photographing processing apparatus. As shown in FIG. 14, an entity of the apparatus may be a terminal device, for example, a mobile phone, a tablet computer, a video camera, or a video recorder. The apparatus includes an acquiring unit 141, a selection unit 142, and a configuration unit 143.

The acquiring unit 141 is configured to acquire each video frame when a camera is turned on.

The selection unit 142 is configured to select, according to a preset photo selection policy, at least one target video frame from the video frames acquired by the acquiring unit 141.

The configuration unit 143 is configured to configure, as a photo that needs to be generated, the at least one target video frame selected by the selection unit 142.

It should be noted that, for other corresponding descriptions corresponding to function units in the video photographing processing apparatus provided in this embodiment of the present disclosure, reference may be made to corresponding descriptions in FIG. 13, and details are not described herein again.

Figure 15:
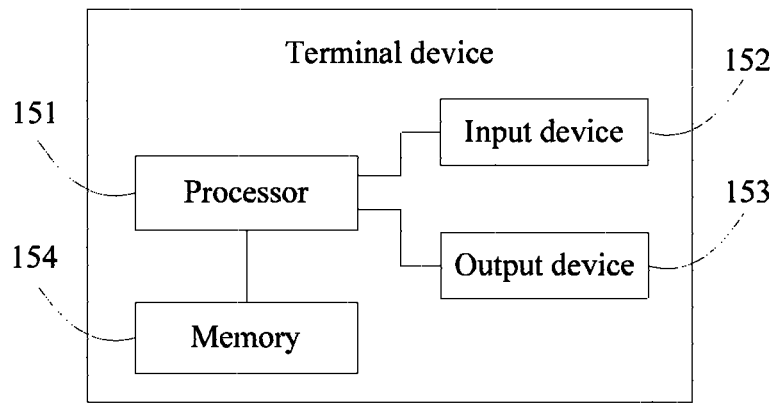
FIG. 15 is a schematic structural diagram of a terminal device according to Embodiment 5 of the present disclosure.

Still further, the entity of the video photographing processing apparatus may be a terminal device. As shown in FIG. 15, the terminal device may include a processor 151, an input device 152, an output device 153, and a memory 154, where the input device 152, the output device 153, and the memory 154 are separately connected to the processor 151.

The processor 151 is configured to acquire each video frame when a camera is turned on.

The processor 151 is further configured to select at least one target video frame from the video frames according to a preset photo selection policy.

The processor 151 is further configured to configure the selected at least one target video frame as a photo that needs to be generated.

It should be noted that, for other corresponding descriptions corresponding to devices in the terminal device provided in this embodiment of the present disclosure, reference may be made to corresponding descriptions in FIG. 13, and details are not described herein again.

According to the video photographing processing method and apparatus provided in this embodiment of the present disclosure, when a camera is turned on, each video frame is acquired first, then at least one target video frame is selected from the video frames according to a preset photo selection policy, and finally, the selected at least one target video frame is configured as a photo that needs to be generated. Compared with a current manner in which a photo that needs to be generated is selected using scores separately corresponding to video frames, in this embodiment of the present disclosure, when a camera is turned on, a photo that needs to be generated is selected according to a preset photo selection policy, so that during video photographing, the photo can be automatically generated, thereby improving accuracy of video frame selection.

Embodiment 6

Figure 16:
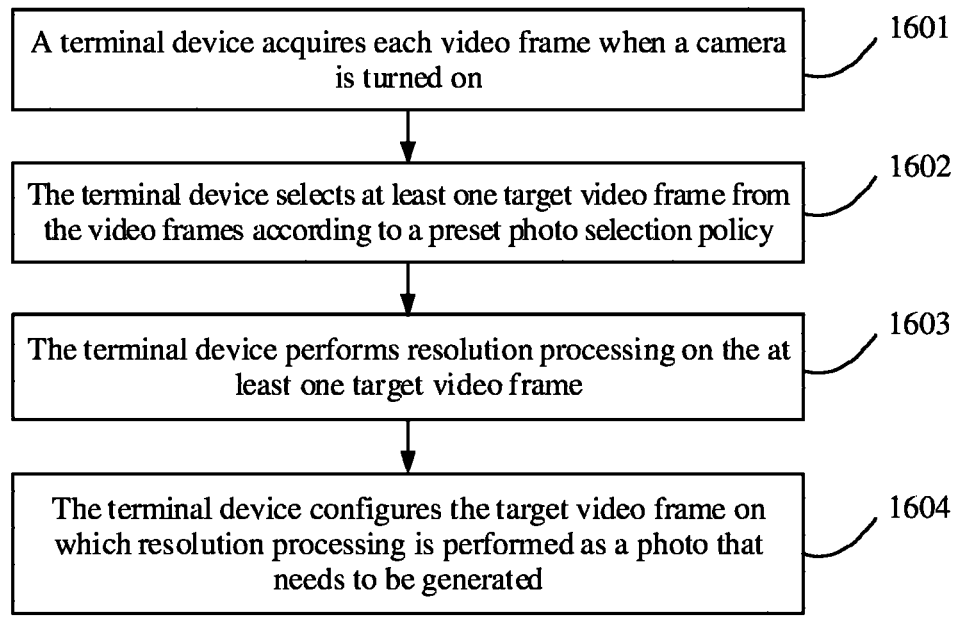
FIG. 16 is a flowchart of a video photographing processing method according to Embodiment 6 of the present disclosure.

This embodiment of the present disclosure provides a video photographing processing method, and as shown in FIG. 16, the method includes the following steps.

Step 1601. A terminal device acquires each video frame when a camera is turned on.

Step 1602. The terminal device selects at least one target video frame from the video frames according to a preset photo selection policy.

For this embodiment of the present disclosure, the at least one target video frame is selected from the video frames, so that during video photographing, the terminal device can automatically generate a photo that needs to be generated, thereby improving user experience.

The preset photo selection policy may be preconfigured by the terminal device. In this embodiment of the present disclosure, the preset photo selection policy may be a photo selection policy corresponding to a photo effect, a quantity of photos, a difference degree of photos, photo content, photo quality, or the like.

In one aspect, when the terminal device selects the at least one target video frame from the video frames using a photo selection policy corresponding to a photo effect, the terminal device may select a photo with the best photo effect from multiple photos corresponding to a same scenario. For example, the terminal device may select a photo with the most smiling faces, the least closed eyes, the least background characters, or the most prominent object.

In another aspect, when the terminal device selects the at least one target video frame from the video frames using a photo selection policy corresponding to a quantity of photos, the terminal device may perform selection in the multiple target video frames according to a preset photo interval, a preset time interval, a preset selection quantity ratio, or the like. For example, the terminal device may select one photo from every fifty photos, the terminal device may select one photo every three minutes, or the terminal device may select 8% photos from the multiple target video frames.

In still another aspect, when the terminal device selects the at least one target video frame from the video frames using a photo selection policy corresponding to a photo similarity, the terminal device may select, from the multiple target video frames, a photo with a relatively large similarity difference. For example, the terminal device may select, from the multiple target video frames, m photos with a relatively large similarity difference in photo content, or the terminal device may select, from the multiple target video frames, m photos with a relatively large time interval; where m is an integer greater than or equal to 1.

In yet another aspect, when the terminal device selects the at least one target video frame from the video frames using a photo selection policy corresponding to photo content, the terminal device may select, from the multiple target video frames, a photo that includes content required by a user. For example, the terminal device may select a photo that includes full body of a character from the multiple target video frames, the terminal device may select a photo that includes face close-up from the multiple target video frames, or the terminal device may select a photo that includes a front face of a character from the multiple target video frames.

In still another aspect, when the terminal device selects the at least one target video frame from the video frames using a photo selection policy corresponding to photo quality, the terminal device may select a photo with relatively high quality from the multiple target video frames. For example, for a landscape photo, the terminal device may select a photo that has proper composition, a clear image, and no sundries from the multiple target video frames; for a character photo, the terminal device may select a photo that has a front face, a smiling face, and no closed eyes from the multiple target video frames; and for a word photo, the terminal device may select a photo that has a clear word and a word in a proper size from the multiple target video frames.

For this embodiment of the present disclosure, the preset photo selection policy may be one photo selection policy in photo selection policies corresponding to a photo effect, a quantity of photos, a difference degree of photos, photo content, photo quality, and the like, or may be a combination of multiple photo selection policies in photo selection policies corresponding to a photo effect, a quantity of photos, a difference degree of photos, photo content, photo quality, and the like.

Step 1603. The terminal device performs resolution processing on the at least one target video frame.

Further, resolution processing is performed on the at least one target video frame, so that resolution of the at least one target video frame can be improved.

Optionally, step 1603 may be the terminal device performs resolution processing on the at least one target video frame by means of upsampling processing. The upsampling processing may be used to improve resolution of the video frame.

For this embodiment of the present disclosure, resolution for the terminal device to perform video photographing is generally less than or equal to resolution for taking a photo, and therefore, performing resolution processing on the photo that needs to be generated can improve resolution of the photo that needs to be generated, so that user experience can be improved.

The person that performs photographing may control the terminal device to perform resolution processing on the photo that needs to be generated, or the terminal device may automatically perform resolution processing on the photo that needs to be generated, which is not limited in this embodiment of the present disclosure. In this embodiment of the present disclosure, when the person that performs photographing controls the terminal device to perform resolution processing on the photo that needs to be generated, the terminal device may provide multiple different types of resolution for the person that performs photographing to select; when the terminal device automatically performs resolution processing on the photo that needs to be generated, the terminal device may perform, according to preset resolution, resolution processing on the photo that needs to be generated, where the preset resolution may be configured by the person that performs photographing, or may be preconfigured by the terminal device, which is not limited in this embodiment of the present disclosure.

For this embodiment of the present disclosure, step 1603 is an optional step.

Step 1604. The terminal device configures the target video frame on which resolution processing is performed as a photo that needs to be generated.

Figure 17:
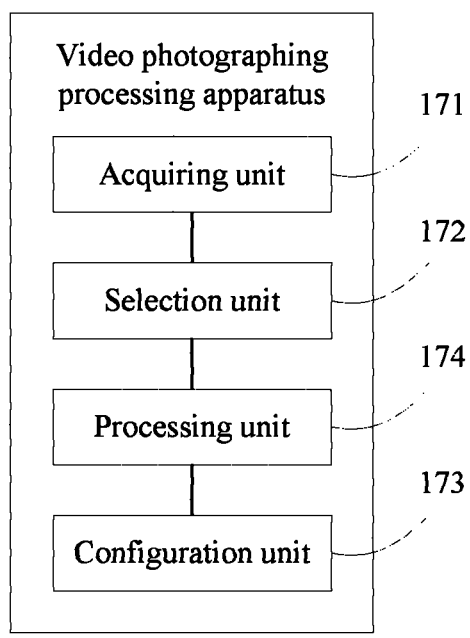
FIG. 17 is a schematic structural diagram of a video photographing processing apparatus according to Embodiment 6 of the present disclosure.

Further, as specific implementation of the method shown in FIG. 16, this embodiment of the present disclosure provides a video photographing processing apparatus. As shown in FIG. 17, an entity of the apparatus may be a terminal device, for example, a mobile phone, a tablet computer, a video camera, or a video recorder. The apparatus includes an acquiring unit 171, a selection unit 172, and a configuration unit 173.

The acquiring unit 171 is configured to acquire each video frame when a camera is turned on.

The selection unit 172 is configured to select, according to a preset photo selection policy, at least one target video frame from the video frames acquired by the acquiring unit 171.

The configuration unit 173 is configured to configure, as a photo that needs to be generated, the at least one target video frame selected by the selection unit 172.

Optionally, the apparatus may further include a processing unit 174.

The processing unit 174 is configured to perform resolution processing on the at least one target video frame selected by the selection unit 172, to improve resolution of the at least one target video frame.

The configuration unit 173 is configured to configure the target video frame on which the processing unit 174 performs resolution processing as the photo that needs to be generated.

It should be noted that, for other corresponding descriptions corresponding to function units in the video photographing processing apparatus provided in this embodiment of the present disclosure, reference may be made to corresponding descriptions in FIG. 16, and details are not described herein again.

Figure 18:
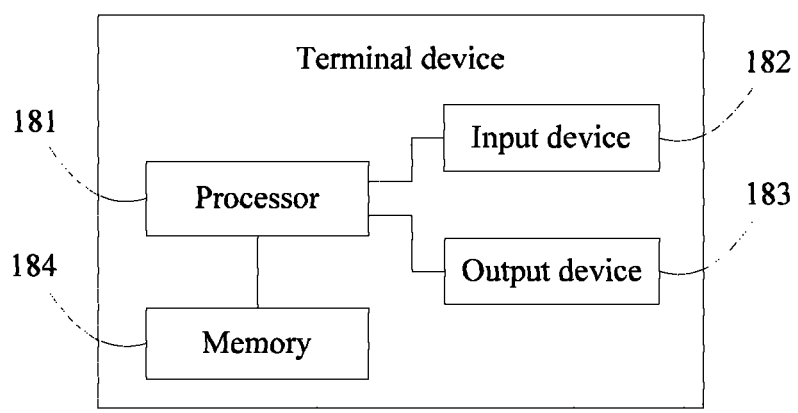
FIG. 18 is a schematic structural diagram of a terminal device according to Embodiment 6 of the present disclosure.

Still further, the entity of the video photographing processing apparatus may be a terminal device. As shown in FIG. 18, the terminal device may include a processor 181, an input device 182, an output device 183, and a memory 184, where the input device 182, the output device 183, and the memory 184 are separately connected to the processor 181.

The processor 181 is configured to acquire each video frame when a camera is turned on.

The processor 181 is further configured to select at least one target video frame from the video frames according to a preset photo selection policy.

The processor 181 is further configured to configure the selected at least one target video frame as a photo that needs to be generated.

The processing unit 181 is configured to perform resolution processing on the selected at least one target video frame, to improve resolution of the at least one target video frame.

The processor 181 is further configured to configure the target video frame on which resolution processing is performed as the photo that needs to be generated.

It should be noted that, for other corresponding descriptions corresponding to devices in the terminal device provided in this embodiment of the present disclosure, reference may be made to corresponding descriptions in FIG. 16, and details are not described herein again.

According to the video photographing processing method and apparatus provided in this embodiment of the present disclosure, when a camera is turned on, each video frame is acquired first, then at least one target video frame is selected from the video frames according to a preset photo selection policy, and finally, the selected at least one target video frame is configured as a photo that needs to be generated. Compared with a current manner in which a photo that needs to be generated is selected using scores separately corresponding to video frames, in this embodiment of the present disclosure, when a camera is turned on, a photo that needs to be generated is selected according to a preset photo selection policy, so that during video photographing, the photo can be automatically generated, thereby improving accuracy of video frame selection.

The video photographing processing apparatus provided in this embodiment of the present disclosure may implement the method embodiment provided above; for specific function implementation, reference may be made to descriptions of the method embodiment. Details are not described herein again. The video photographing processing method and apparatus provided in this embodiment of the present disclosure may be applicable to automatic generation of a photo during video photographing, but are not limited thereto.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video photographing processing method, comprising:
    acquiring, with a camera of a terminal device, one or more video frames of a photographed person when the camera is turned on;
    detecting at least one behavior information of the photographed person in the one or more video frames of the photographed person;
    determining whether a predefined behavior information for a to-be-generated photo matches the at least one behavior information of the photographed person in the one or more video frames, the predefined behavior information for the to-be-generated photo being predefined by the photographed person; and
    configuring a target video frame from the one or more video frames when the predefined behavior information for the to-be-generated photo matches the at least one behavior information of the photographed person, the target video frame being at least one of a video frame corresponding to the predefined behavior information or any video frame subsequent to a video frame corresponding to the predefined behavior information for the to-be-generated photo.

2. The video photographing processing method according to claim 1, wherein the predefined behavior information comprises expression behavior information, voice behavior information, and action behavior information.

3. The video photographing processing method according to claim 1, wherein before configuring the target video frame from the one or more video frames as the to-be-generated photo, the method further comprises:

performing resolution processing on the target video frame to improve resolution of the target video frame; and configuring the target video frame on which resolution processing is performed as the to-be-generated photo.

4. The video photographing processing method according to claim 1, wherein there are multiple target video frames, and before configuring the target video frame as the to-be-generated photo, the method further comprises:

selecting at least one target video frame from the multiple target video frames according to a photo selection policy; and configuring the at least one target video frame as the to-be-generated photo.

5. The video photographing processing method according to claim 1, wherein any video frame subsequent to the video frame corresponding to the behavior information for the to-be-generated photo is a next subsequent video frame of the video frame corresponding to the predefined behavior information for the to-be-generated photo.

6. A video photographing processing apparatus, comprising:

a memory comprising instructions; and a processor coupled to the memory, the instructions causing the processor to be configured to:

acquire one or more video frames of a photographed person when a camera is turned on;

detect at least one behavior information of the photographed person in the one or more video frames of the photographed person;

determine whether a predefined behavior information for a to-be-generated photo matches the at least one behavior information of the photographed person in the one or more video frames, the predefined behavior information for the to-be-generated photo being preconfigured by the photographed person; and configure a target video frame from the one or more video frames when the predefined behavior information for the to-be-generated photo matches the at least one behavior information of the photographed person, the target video frame being a video frame corresponding to the predefined behavior information for the to-be-generated photo, or any video frame subsequent to a video frame corresponding to the behavior information for the to-be-generated photo.

7. The video photographing processing apparatus according to claim 6, wherein the at least one behavior information comprises expression behavior information, voice behavior information, and action behavior information.

8. The video photographing processing apparatus according to claim 6, wherein the instructions further cause the processor to be configured to:

perform resolution processing on the target video frame to improve resolution of the target video frame; and configure the target video frame on which the resolution processing is performed as the to-be-generated photo.

9. The video photographing processing apparatus according to claim 6, wherein the instructions further cause the processor to be configured to:

select at least one target video frame from multiple target video frames according to a photo selection policy; and configure, as the to-be-generated photo, the at least one target video frame selected.

10. The video photographing processing apparatus according to claim 6, wherein any video frame subsequent to the video frame corresponding to the predefined behavior information for the to-be-generated photo is a next subsequent video frame subsequent to the video frame corresponding to the predefined behavior information for the to-be-generated photo.

11. The video photographing processing method according to claim 1, wherein any video frame subsequent to the video frame corresponding to the behavior information for the to-be-generated photo is a video frame that is at a next time point subsequent to the video frame corresponding to the predefined behavior information for the to-be-generated photo.

12. The video photographing processing apparatus according to claim 6, wherein any video frame subsequent to the video frame corresponding to the predefined behavior information for the to-be-generated photo is a video frame that is at a next time point of the video frame corresponding to the predefined behavior information for the to-be-generated photo.

* * * * *